United States Patent [19]

Hamed

[11] 3,943,079
[45] Mar. 9, 1976

[54] DISCONTINUOUS CELLULOSE FIBER TREATED WITH PLASTIC POLYMER AND LUBRICANT

[75] Inventor: Parviz Hamed, Akron, Ohio

[73] Assignee: Monsanto Company, St. Louis, Mo.

[22] Filed: Mar. 15, 1974

[21] Appl. No.: 451,519

[52] U.S. Cl.................. 260/17.4 BB; 260/17.4 CL
[51] Int. Cl.².......................................... C08L 1/02
[58] Field of Search............. 260/17.4 CL, 17.4 BB; 161/59, 244, 250

[56] References Cited
UNITED STATES PATENTS

| | | | |
|---|---|---|---|
| 2,476,347 | 7/1949 | Allan | 260/17.2 |
| 2,781,147 | 2/1957 | Ruschman | 260/17.4 |
| 3,524,796 | 8/1970 | Yui et al. | 106/213 |
| 3,697,364 | 10/1972 | Boustany et al. | 161/59 |
| 3,709,845 | 1/1973 | Boustany et al. | 260/17.4 |

*Primary Examiner*—Harold D. Anderson
*Assistant Examiner*—Edward Woodberry

[57] ABSTRACT

Discontinuous cellulose fiber is treated with both plastic polymer and lubricant to produce improved treated fiber for reinforcing a plastic matrix.

25 Claims, No Drawings

3,943,079

DISCONTINUOUS CELLULOSE FIBER TREATED WITH PLASTIC POLYMER AND LUBRICANT

This invention relates to treating fiber for the manufacture of composites of discontinuous fiber and a polymer matrix and particularly, to processes for preparing improved treated cellulose fiber and to the resulting products.

BACKGROUND OF THE INVENTION

Reinforcement of polymer matrices by incorporation of discontinuous or short fiber is well-known. However, the incorporation of discontinuous cellulose fiber into massed polymers is difficult. Intensive prolonged mixing is required to disperse the fiber, and sometimes mix temperatures are generated so high that the composite must be dumped and allowed to cool before further processing. Some cellulose fibers are subject to extensive breakage during mixing. Breakage must be avoided to achieve maximum reinforcement which can only be obtained by preserving the fiber length. It is particularly difficult to obtain high strength fiber-polymer composites using fibers which possess a high degree of fiber interaction, such as unregenerated cellulose fibers, because the fibers tend to cling together in bundles of more than a single fiber and resist dispersion of the individual fibers.

For preparing a composite of polymer matrix reinforced with cellulose fiber, it is recognized that pretreatment of the fiber with material to reduce fiber-to-fiber interaction prior to incorporating it into the matrix aids dispersion and greatly improves the properties of the composite, Boustany and Coran U.S. Pat. No. 3,697,364. The pretreatment appropriately called "predispersion" may be with rubber latex or other substances which reduce fiber-to-fiber interaction. A plasticizer for the cellulose, examples of which are moisture and glycerine, is also present to inhibit fiber breaking on mixing into the polymer matrix. However, the presence of moisture is highly undesirable for some purposes and the presence of volatile substances or substances which plasticize the cellulose to the extent of significantly softening and swelling the fiber structure itself, may have undesirable side effects. Moreover, pretreating the fiber and mixing the treated fiber into the polymer matrix on a factory or semiwork scale are demanding of both time and equipment. The present invention simplifies the preparation of treated fiber and provides an improved polymer treated fiber or concentrate which incorporates into a polymer matrix quickly without excessive fiber breaking and without generating a high mix temperature.

SUMMARY OF THE INVENTION

It has been discovered that improved predispersed unregenerated cellulose fiber is simply prepared by treating the fiber with limited amounts of plastic polymer in the presence of a lubricant. Subjecting unregenerated cellulose fiber to the shearing forces, resulting from mixing minor proportions of plastic polymer and lubricant with fiber, effects separation of the individual fiber filaments in minimal time and the presence of the polymer inhibits them from again agglomerating into fiber bundles. By lubricant is meant an auxiliary material which is adsorbed by the fiber and facilitates disentanglement of the individual fibers. The lubricant is believed to produce the aforesaid effect by wetting and reducing friction of the fiber surfaces. Regardless of the correct explanation, it is observed that the lubricant is adsorbed by the fiber and enhances receptiveness of the fiber to the polymer thereby shortening the time required for mixing the fiber and polymer to effect fiber separation and dispersion. It is in the aforesaid sense of being adsorbed by the fiber and abetting the shearing forces in separating the fibers that lubricating the fiber is to be understood herein. It is not to be confused with internal plasticization of the cellulose or of the polymer. Although both plasticizing effects may be exerted to a degree, they are incidental to the results obtained and may have undesirable effects in the extreme. For example, when using solid polymer, plasticizing it to a low viscosity product may reduce the shearing forces to an ineffectual level depending upon the mixing equipment used.

Because masticating plastic polymer and cellulose fiber tends to break the fiber so that in general, mixing times have been inversely proportional to the strengths of the final fiber reinforced polymer matrix, the reduction of mixing time due to the presence of the lubricant is important for preserving the length of the fiber as well as for economy of production. Also, the presence of the lubricant in the treated fiber concentrate promotes dispersion of the fiber upon dilution with more plastic polymer. However, the effect is largely dissipated if the lubricant is combined directly with fiber and polymer in such proportions that the polymer is the major component with respect to the fiber. On the other hand, combining the fiber with only a minor proportion of plastic polymer together with lubricant effects significant improvements. It is believed that the presence of a minor proportion of plastic polymer opens the fiber bundles and may reduce fiber breaking as compared to masticating the fiber and lubricant alone. The properties of composites prepared from fiber treated with the combination are improved as compared to composites prepared from fiber treated only with lubricant. Thus, the lubricant and minor proportion of plastic polymer exert mutually beneficial effects. The fiber treated with the combination of lubricant and minor proportion of plastic polymer is an improved treated fiber product which disperses adequately into a matrix compatible with the polymer without unacceptable fiber breakage under the severe conditions of short mixing cycles. The weight of the fiber exceeds the weight of any other single component of the concentrate and, preferably, the weight of fiber exceeds the total weight of all the other components of the treated fiber or concentrate, making the fiber the major component.

The amount of polymer is sufficient to separate the individual fiber filaments, increase the bulk density of the separated fiber filaments and prevent agglomeration thereof. The amount which accomplishes the aforesaid functions appears to be an amount which, in combination with the lubricant, coats the fiber but higher amounts at least up to about 50 parts by weight of polymer per 100 parts by weight fiber can be used. The optimum amount of polymer required varies somewhat depending upon the type and amount of the lubricant. In general, no more than 50 parts by weight of polymer per 100 parts by weight of fiber need be used and sometimes as low as 2–3 parts by weight are adequate. Preferably, the amount of polymer is about 2.5–30 parts by weight per 100 parts by weight fiber.

The amount of lubricant should be sufficient to reduce friction between the fiber and increase receptivity to the polymer. Mixing time to separate the fiber provides a measure of receptivity of the fiber to the polymer. For preparing a concentrate with minimal fiber breakage and one which mixes rapidly with more polymer, again with minimal fiber breakage, the amount of lubricant may be equal to or greater than the weight of polymer and may be two or more times the weight of polymer. When less lubricant than polymer is used, longer mixing times sometime result. Generally, the amount of lubricant is about 5–60 parts by weight per 100 parts by weight fiber, with 10–50 parts by weight lubricant being preferred and with about 10–40 parts by weight lubricant per 100 parts by weight fiber being more preferred. As hereinafter explained, mixing time is a function, not only of the amount of polymer and lubricant, but of their ratio and the total amount of polymer plus lubricant.

In general, treating the fiber with lubricant and plastic polymer is effected by simply blending the ingredients in a mixer. THe suitability of a mixer will depend in part, at least, on the form of the polymer, for example, whether it is a normally hard polymer requiring plasticizer to process it at practical temperatures, latex, massed elastomer or liquid rubber. Apparatus in the class of mixers for pastes and plastic materials is suitable. These mixers are said to effect a combination of low speed shear, smearing, wiping, folding, stretching and compression. Although the fiber, polymer and lubricant may be charged at the same time, it is feasible first to charge only fiber and lubricant, mix for a short time to wet the fiber with lubricant and partially disentangle it, then add the polymer and complete the mixing. It is also feasible first to charge only lubricant and plastic polymer as for example, by using oil extended rubber. The fiber may be fed in particulate or in sheet form. In either case, if desired, the fiber may be pretreated with lubricant, for example, by spreading lubricant over the surface of sheets of fiber, allowing it to be adsorbed, and then feeding lubricant-treated fiber to the mixer. If the form of polymer is appropriate, it is advantageous to use the shearing forces from masticating the polymer to aid separation of the fiber for which purpose an internal mixer is particularly well suited. An internal mixer is one having the mixing chamber enclosed and usually having blades which move at different speeds. Examples of suitable internal mixers are Uni-Rotor mixer, Patterson-Kelly mixer with intensifier, Baker-Perkins mixer, Brabender mixer, Banbury mixer, Werner and Pfleiderer mixer and Rotomill. However, with some mixers, such as a Banbury, extreme care must be exercised in charging fiber, especially in sheet form, and mixing to avoid damage or breakage of the mixer.

Amounts of other ingredients, such as bonding agents, fillers and reinforcing pigments, may be added but are usually incorporated when the concentrate is mixed with additional polymer. However, it is sometimes advantageous to incorporate small amounts of reinforcing pigments such as carbon black or silica into the concentrates because, in some instances, they appear to facilitate disentanglement of the fiber. Generally, the quantity of reinforcing pigments incorporated into the concentrate will not exceed the amount of lubricant and additional quantities will be added along with other compounding ingredients for preparing the final composite compositions. The bonding agent, when present in the concentrate, is usually a suitable matrix adjuvant for bonding fiber to the matrix, for examplle, resorcinol, resorcinol derived resin or other phenolic methylene acceptor. A methylene donor may also be present or be added when the concentrate is diluted. Bonding systems for treating the matrix to bond textile fiber to rubber and other plastic polymers are useful for bonding discontinuous cellulose fiber to a matrix and one or more of the ingredients of such a system may, if desired, be incorporated into the concentrate. These systems are well-known and will not be described in detail. A typical and preferred system is described by Morita, U.S. Pat. No. 3,644,268, comprising alkylene resorcinol polymer, hereinafter referred to as "alkylene resorcinol bonding agent" and hexamethylenetetramine or other formaldehyde donor.

In general, the concentrates issue from the internal mixer as particulate crumb suitable for directly mixing with additional polymer to form final composites of the desired fiber concentration. Although the treated fiber is generally free from apparent liquid and susceptible to compression into a sheet or bale, it is only loosely bound and the binding is easily reversible. Even a compressed product is frangible, the fiber being bound merely by the polymer present and inhibited from fiber-to-fiber affinity so that the product is dispersive in the sense that it tends to disperse and disintegrate upon the application of moderate force. The irregular particulate form which usually issues from the internal mixer comprises springy, spongy clusters of fiber lightly held together. The dilution of concentrate with additional polymer may be carried out in an internal mixer or on a roll mill. In the preparation of composites containing high concentration of fiber, internal mixers are recommended whereas in the preparation of composites of low fiber concentration, a roll mill is recommended. Any cellulose which has an aspect ratio greater than one is advantageously converted to pretreated concentrate according to this invention.

In general, organic fibers which are susceptible to breaking on mixing with polymer matrix are advantageously predispersed as described herein prior to incorporating into the matrix. The discontinuous unregenerated cellulose fibers, of which wood fiber is preferred, will generally have an average aspect ratio within the range of 5–350. More preferred ranges are 20–350 and 50–200. Examples of satisfactory cellulose fibers are cotton, sisal, coconut and flax, and particularly soft or hardwood pulp fibers. Wood pulp normally contains equilibrium amounts of water at ambient atmosphere but the amounts of water present can vary widely. The predispersed concentrate may comprise mixtures of fibers including mixtures of different size fiber and mixtures of natural or synthetic inorganic fibers and synthetic organic fibers. The fiber concentrates of this invention are particularly suitable for the preparation of composites described in Boustany and Coran U.S. Pat. Nos. 3,697,364 and 3,709,845, the disclosures of which are incorporated herein by reference. The advantage of making both the treated fiber and the final product in equipment commonly used for mixing plastic polymers and improved efficiency of making the composites has been achieved by the present invention.

Any organic polymer which can be processed as a thermoplastic substance is useful for the practice of this invention. In the unvulcanized state, elastomers are herein classified as thermoplastic substances and constitute a preferred subclass of plastic polymers. Elastomers are utilizable in either latex or bulk form but the latter is contemplated primarily, for the reasons explained above. Examples of elastomers suitable for the preparation of concentrates of this invention are natural rubber, styrene-butadiene rubber (SBR), ethylene-propylene rubber (EPR), ethylene-propylene terpolymer (EPDM), acrylonitrile butadiene rubber (NBR), ethylene-vinylacetate copolymer, silicone rubber, polybutadiene rubber, cis-polybutadiene, trans-polybutadiene, neoprene, polyisoprene and butyl rubber. A preferred subgroup of elastomers comprises sulfur-vulcanizable diene rubbers. Diene rubber includes rubber of both low and high unsaturation, the unsaturation being either in a side chain or in the backbone of the polymer and either conjugated or non-conjugated.

Examples of other suitable plastic polymers are low or high density polyethylene, acrylate polymers, urethane polymers, chlorosulfonated polyethylene, polyvinyl chloride, polypropylene, halogenated polyethylene, polystyrene, polyvinyl acetate, acrylonitrile butadiene-styrene terpolymers (ABS), polyamides and polyesters. Chlorosulfonated polyethylene and halogenated polyethylene are regarded as elastomers in the vulcanized state but use in the process of the present invention involves the unvulcanized state. The polymer of the composite may be the same or different from the elastomer of the concentrate, it only being necessary that the two polymers are compatible.

The term "lubricant" is used in the present specification and accompanying claims in a functional sense to designate materials adsorbed by the fiber surface which enhance receptiveness of the fiber to polymer, presumably, at least in part, by reducing friction of the fibers in sliding over one another. A lubricant of the fiber will, in most cases, be an oily or unctuous substance and includes organic materials commonly designated as softeners, plasticizers, extender oils and waxes for treating plastic polymers, more specifically, rubber processing oils, for example, mineral or petroleum oils either paraffinic, aromatic or naphthenic; vegetable oils, for example, cottonseed oil, castor oil and corn oil; fatty acids, for example, stearic acid and oleic acid; crystalline or non-crystalline waxes; low molecular weight phenolic resins; low molecular weight olefinic polymers (5000 MW or less), coal tar fractions; coumarone-indene resins; polyols such as polyethylene glycol and mono-, di- and polyesters of organic acids. Esters of organic acids comprise a large body of commercial plasticizers, such as dioctyl phthalate, which function admirably as fiber lubricants.

Examples of satisfactory lubricants include those materials described as physical softeners on pages 157–166, Morton, *Introduction to Rubber Technology*, Rhenhold Publishing Corp., New York, and those materials described as plasticizers on pages 766–773, Kirk-Othmer, V-10, *Encyclopedia of Chemical Technology*, Interscience Encyclopedia, Inc., New York. See also U.S. Pat. No. 2,180,906. Lubricating textile fibers is a well developed art and the lubricating ingredients of textile finishes provide a wide selection from which to choose a lubricant for practicing the present invention. Because maintaining the friction coefficient between fiber-to-fiber as low as possible is most desirable in the spinning and drawing of textile fiber, an important feature of a fiber finish is its lubricity. In general, lubricants for finishing textile fiber may be employed in practicing the present invention, examples of which are white mineral oils, petroleum sulfonates, triglycerides, ethoxylated and sulfonated derivatives of triglycerides, triethanolamine, tridecylalcohol reacted with 13 moles of ethylene acid, butyl stearate, alkyl phenol condensed with 9 moles of ethylene oxide, sorbitan monolaurate, ethoxylated castor oil having 15–25 moles of ethylene oxide combined per mole of castor oil, hydrogenated vegetable oil, sulfonated peanut oil, octyl stearate and polyethylene glycol oleyl ether. The liquids and waxes disclosed as lubricants in spin finishes for yarns to be bonded to rubber disclosed by Brignac, U.S. Pat. No. 3,630,259, Nov. 24, 1969 are desirable lubricants and the disclosures of the aforesaid patent are incorporated herein by reference.

Of course, a mixture of two or more lubricants may be used in which case the sum of their weights is the amount of lubricant. For example, if a concentrate is prepared using for each 100 parts by weight fiber, 10 parts by weight aromatic processing oil, 9 parts by weight stearic acid and 3 parts by weight paraffin wax, the amount of the lubricant is 22 parts by weight per 100 parts by weight fiber. It will be appreciated that the compatibility of the lubricant with the plastic polymer of the concentrate and with the plastic polymer of the final matrix should be considered in selecting a satisfactory lubricant. The compatibility of lubricants and various polymers is well-known and within the skill of experienced compounders. Moreover, some low molecular weight textile lubricants, notably glycerine, ethylene glycol and propylene glycol, have been observed to adversely affect tensile strength of the composite. A molecular weight of above 95 is desirable. There is also evidence that low water solubility is advantageous for optimum properties in a bonded fiber reinforced composite. An especially valuable class of lubricants are also processing aids for polymers and have a molecular weight of 125 or above. Of the aforesaid valuable class, optimum properties in the fiber reinforced bonded composites appear to result from lubricants of molecular weight 150 and above having limited solubility in water. A softening or plasticizing (internal lubrication) of the plastic polymer by the preferred lubricants undoubtedly contributes to the efficacy of the disclosed process but it is not possible to define precisely the contribution of the individual effects toward enhancing the receptiveness of the fiber to treatment with the polymer and producing a treated fiber without excessive breakage.

DESCRIPTION OF THE PREFERRED EMBODIMENTS

As illustrative of predispersed fiber compositions comprising both plastic polymer and lubricant, hardwood fiber is treated with lubricant and a blend of natural and synthetic rubber in an internal mixer. The blend of rubber is a masterbatch designated "H-1 Masterbatch."

H-1 MASTERBATCH

|  | Parts by Weight |
| --- | --- |
| Natural rubber | 50.0 |
| Styrene-butadiene rubber | 50.0 |
| HAF carbon black | 50.0 |
| Precipitated silica (Hi-Sil) | 5.0 |
| Zinc oxide | 3.0 |
| p-Phenylenediamine antidegradant | 2.0 |
| Stearic acid | 1.0 |
| Total | 161.0 |

Fiber concentrates comprising about 10 parts by weight of rubber and 20 parts by weight of lubricant per 100 parts by weight of fiber are prepared by mixing 100 parts hardwood dry lap pulp, 16.1 parts H-1 Masterbatch and 20 parts lubricant in an internal mixer, for example, in a Baker-Perkins mixer for 5–10 minutes or a "B" Banbury mixer (about 1573 cc capacity) for about 5 minutes. The lubricants are identified in the table below. In these embodiments and all embodiments hereafter, all parts are by weight and the concentrate formulas are based on 100 parts by weight of fiber unless otherwise specified.

EXAMPLES 1–11

TABLE I

| Fiber Concentrate Example | Lubricant |
| --- | --- |
| 1 | Corn oil (Mazola) |
| 2 | Vegetable oil (Wesson) |
| 3 | Olive oil |
| 4 | Cottonseed oil |
| 5 | Pine tar oil |
| 6 | Castor oil |
| 7 | Aromatic processing oil |
| 8 | Palm oil |
| 9 | Peanut oil |
| 10 | Rosin oil |
| 11 | Rape-seed oil |

Each of the eleven fiber concentrates is used to prepare fiber reinforced polymer by mixing 102 parts of the concentrate, 149 parts of H-1 Masterbatch, 5 parts of methylene acceptor, 5 parts of aromatic processing oil, 1 part of methylene donor, 2 parts of sulfur and 1 part of N-tertiarybutyl-2-benzothiazolesulfenamide in a B Banbury for six minutes at slow speed (77 revolutions per minute). Samples of each composite after sheeting out on a mill and curing for 30 minutes in a press at 152.8°C (307°F) give, in the direction of principal fiber orientation (0° orientation), a tensile strength equal to or greater than 2000 pounds per square inch (psi) or 140.616 kilograms per square centimeter (ksc) and a Young's modulus equal to or greater than 30,000 psi (2109.24 ksc). Excellent and rapid dispersion of the fiber concentrate is observed in each case. Concentrates 7–11 produce composites having tensile strengths of about 2500–3000 psi (175.77–210.924 ksc) and Young's modulus in excess of 30,000 psi. In addition, concentrates 8–11 impart pleasant odors to the products.

EXAMPLE 12

As illustrative of another embodiment, there are charged to an internal mixer 800 parts EPDM rubber of plasticity ML (1+4) at 121.1°C of about 70 (ML (1+4) indicates plasticity determined with the Mooney viscometer using the large rotor and running for 4 minutes after a warm-up period of 1 minute), 6000 parts hardwood dry lap pulp, 800 parts FEF carbon black and 1600 parts paraffinic processing oil. The ingredients are mixed for about 5 minutes and discharged to give 9200 parts concentrate comprising per 100 parts of fiber, 13.3 parts each of rubber and carbon black and 26.6 parts of lubricant.

To illustrate use of the concentrate, there are charged to a 1-A Banbury mixer (about 16026 cc capacity) 800 parts EPDM rubber of plasticity ML (1+4) at 121.1°C of about 70, 1000 parts EPDM rubber of plasticity ML (1+4) at 121.1°C of about 60, 2200 parts FEF carbon black, 2300 parts concentrate of Example 12, 1600 parts paraffinic processing oil, 100 parts zinc oxide, 20 parts stearic acid, 100 parts alkylene resorcinol bonding agent, 40 parts methylene donor (hexamethoxymethylmelamine), and 140 parts curatives. The ingredients are mixed at 35 rpm for 6 minutes (minimum time to disperse the treated fiber as determined by visual inspection) and dumped to recover a composite containing 75 parts fiber per 100 parts rubber.

A total mixing time is calculated by taking into consideration both the time to prepare predispersed fiber and the time to prepare the composite from the predispersed fiber. Because the time for producing a unit of product determines production efficiency and only a fraction of the concentrate batch is used in preparing the final composite, the time to prepare said fraction is used to calculate a total mixing time by multiplying the fraction of the concentrate batch used by the 5 minute mixing time for making the total batch of concentrate and adding the time so calculated to the 6 minutes required for mixing in the concentrate fraction. Portions of composite are passed through an even speed roll mill to orient the fiber and to put the composite in sheet form. The oriented sheets are vulcanized in a press for the times indicated by Rheometer data to achieve optimum cure. The mixing time and physical properties of the vulcanized composite determined in the direction of the principal fiber (0° orientation) are shown in Table II. The data are herein shown in metric units but it will be understood that measurements are made in English units and any averaging or rounding off to the nearest significant unit done prior to conversion so that the number of significant figures given in metric units is greater than would otherwise be the case.

TABLE II

| Mixing Time, minutes | UTS, ksc | % Ult. Elong. | Young's Modulus, ksc |
| --- | --- | --- | --- |
| 7.25 | 151.317 | 12 | 1879.146 |

The data show that a fiber reinforced composite of desirable physical properties is produced in a short mixing cycle from fiber pretreated with both polymer and lubricant.

Study of the effect which the amount and proportion of fiber, elastomer (SBR and EPDM) and lubricant have on mixing times for making the concentrate shows that with 10 or 20 parts elastomer and 10 parts of carbon black increasing amounts of lubricant up to about 30–40 parts reduce the mixing time for making treated fiber. With 40 parts of lubricant and 5–20 parts of carbon black decreasing amounts of elastomer, at least down to about 5 parts, reduce the mixing time. Similarly, decreasing mixing time for preparing concentrate from equal parts of lubricant and elastomer is observed upon increasing the lubricant from 10 to 40 parts, i.e., increasing the total of lubricant and elastomer from 20 to 80 parts. If the total amount of lubricant and elastomer is kept constant at 50 parts, decreasing mixing time is observed with increasing ratio of lubricant to elastomer over the range of 5/45 to 40/10. On the other hand, the mixing time required to prepare concentrate from 10 parts each of lubricant and elastomer may be reduced by as much as one-half by increasing the amount of elastomer to 40 parts. Thus, if it is desired to keep the proportion of lubricant low, say 10 parts per 100 of fiber, then it is preferred that the total amount of lubricant and polymer constitute about 50–80 parts per 100 parts of fiber. In general, the shorter the mixing time, the better the physical properties of the composite but the adverse effect of longer than optimum mixing times for making concentrate on the modulus of the composite is less severe if the amount of lubricant is equal to or greater than the amount of plastic polymer. For example, 16 minutes required to prepare a concentrate from 50 parts total lubricant plus elastomer, in which total the lubricant is the minor ingredient, may be as detrimental as twice the mixing time for preparing concentrates from 10 parts each of lubricant and elastomer.

EXAMPLE 13

In still another embodiment using natural rubber and a different lubricant, there are charged to an internal mixer 1000 parts natural rubber, 1000 parts SPF carbon black, 1500 parts lubricant and 5000 parts hardwood dry lap pulp. The ingredients are mixed for about 5 minutes and discharged to give 8500 parts of concentrate.

As illustrative of use of the concentrate, there are charged to a "0-0" Banbury mixer (about 4310 cc capacity) 900 parts peptized natural rubber, 850 parts concentrate of Example 13, 300 parts SPF carbon black, 50 parts precipitated silica, 50 parts zinc oxide, 20 parts stearic acid, 20 parts p-phenylenediamine antidegradant, 50 parts alkylene resorcinol bonding agent, 20 parts hexamethoxymethylmelamine, 20 parts sulfur and 10 parts sulfenamide accelerator. The ingredients are mixed at 50 rpm for 6 minutes. Rapid dispersion is observed and a composite containing 50 parts fiber per 100 parts rubber is recovered. The composite is oriented on an even speed roll mill and vulcanized in a press to achieve optimum cure. The physical properties are shown in Table III.

TABLE III

| Lubricant | UTS, ksc | % Ult. Elong. | Young's Modulus, ksc |
|---|---|---|---|
| Diundecyl phthalate | 224.985 | 9 | 3480.246 |

Three concentrates are prepared to illustrate the effect of the combined and separate fiber treating adjuvants by mixing the ingredients shown in Table IV in a B Banbury at 155 rpm for 5 minutes (about 2 minutes to charge ingredients and 3 minutes after ram down). Also shown is the batch size factor which is the number by which the parts by weight must be multiplied to give the amounts charged.

TABLE IV

| | Concentrate Example | | |
|---|---|---|---|
| | 14 | 15 | 16 |
| Ingredients | Parts by Weight | | |
| Hardwood dry lap pulp | 100 | 100 | 100 |
| Styrene-butadiene copolymer rubber | 10 | 10 | — |
| Lubricant (aromatic processing oil) | 20 | — | 20 |
| Batch size factor | 6.5 | 8.0 | 7.0 |

Composites are prepared by diluting the concentrates shown in Table IV in a B Banbury at 77 rpm for the times indicated in Table V. In each case the stock comprises 150 parts natural rubber, 150 parts HAF carbon black, 22.5 parts silica, 9 parts zinc oxide, 3 parts stearic acid, 6 parts N-substituted p-phenylenediamine antidegradant, 15 parts alkylene resorcinol bonding agent, 3 parts hexamethylenetetramine, 6 parts sulfur, and 3 parts sulfenamide accelerator together with the variable ingredients indicated in the table. The times are the minimum times to disperse the fiber as determined by inspection. Thus, inspection of Stocks B and C after 6 minutes mixing, which is sufficient for dispersing the fiber of Stock A, shows that the fiber is not adequately dispersed. The total of each stock is 802.5 parts by weight.

TABLE V

| | Stock A | Stock B | Stock C |
|---|---|---|---|
| Variable Ingredients | Parts by Weight | | |
| Styrene-butadiene copolymer rubber | 127.5 | 127.5 | 150 |
| Aromatic processing oil | 15 | 60 | 15 |
| Concentrate 14 | 292.5 | — | — |
| Concentrate 15 | — | 247.5 | — |
| Concentrate 16 | — | — | 270 |
| Mixing time, minutes | 6 | 10 | 10 |
| Dispersion | Good | Fair | Fair |

The data indicate that a composite is prepared in a shorter time by using a concentrate of fiber treated with both plastic polymer and lubricant as compared to fiber treated with either polymer or lubricant alone. Moreover, it is observed from stress-strain data on the vulcanizates at 0° orientation that the Young's modulus of Stock A is significantly higher than that of either Stock B or Stock C. When it is desired to reduce the moisture content to a minimum, curatives may be omitted and the treated fiber mixed with the matrix composition at high Banbury mixing speed. The high temperatures generated effectively drive out moisture. The batch is then dumped and after cooling it is mixed with curatives and further processed as desired.

EXAMPLES 17 – 20

The following illustrate embodiments of the invention in which the concentrate is prepared using rubber latex instead of massed rubber.

To a B Banbury mixer, the ingredients shown in Table VI are charged and mixed at 155 rpm for 5 minutes (about 2 minutes to add ingredients and 3 minutes after ram is down). The latex is an aqueous emulsion of a styrene-butadiene-vinylpyridine terpolymer containing 42% solids (parts elastomer are indicated in parentheses).

TABLE VI

| | Concentrate Example | | | |
|---|---|---|---|---|
| | 17 | 18 | 19 | 20 |
| Ingredients | Parts by Weight | | | |
| Hardwood dry lap pulp | 100 | 100 | 100 | 100 |
| Rubber latex | 25 | 12.5 | 25 | 12.5 |
| | (10.5) | (5.25) | (10.5) | (5.25) |
| Lubricant | 20 | 20 | 20 | 20 |
| (Aromatic processing oil) | | | | |
| SPF carbon black | 10 | 10 | — | — |
| Precipitated silica | — | — | 10 | 10 |
| Batch size factor | 6 | 6 | 6 | 6 |

Each concentrate is dried at 100°C for 8 hours before dilution with additional polymer and composites are prepared by mixing for 6 minutes the ingredients shown in Table VII in a B Banbury at 77 rpm and vulcanized by heating in a press for the time to achieve optimum cure and the physical properties measured in the 0° direction. Precipitated silica seems to facilitate the action of the lubricant in certain systems.

TABLE VII

| | Stock D | Stock E | Stock F | Stock G |
|---|---|---|---|---|
| Ingredients | Parts by Weight | | | |
| H-1 Masterbatch | 483 | 483 | 483 | 483 |
| Concentrate 17 | 315 | — | — | — |
| Concentrate 18 | — | 304 | — | — |
| Concentrate 19 | — | — | 315 | — |
| Concentrate 20 | — | — | — | 304 |
| Aromatic processing oil | 15 | 15 | 15 | 15 |
| Alkylene resorcinol bonding agent | 15 | 15 | 15 | 15 |
| Hexamethylenetetramine | 3 | 3 | 3 | 3 |
| Sulfur | 6 | 6 | 6 | 6 |
| Sulfenamide accelerator | 3 | 3 | 3 | 3 |
| Total | 840 | 829 | 840 | 829 |
| Stress-Strain | | | | |
| UTS, ksc | 241.776 | 232.016 | 263.655 | 267.170 |
| % Ult. Elongation | 9 | 9 | 9 | 9 |
| Young's Modulus, ksc | 4253.634 | 4534.866 | 4429.404 | 4851.252 |

Typical concentrates containing bonding agents are illustrated in Table VIII. In general, concentrates containing bonding agent are prepared in the same manner as described above, however, with certain bonding agents special steps should be taken to ensure adequate dispersion in the concentrate. Sometimes, simply grinding to reduce the particle size is enough or the bonding agent may be dissolved in the lubricant used for making the concentrate. Alternatively, a masterbatch of rubber and bonding agent may be prepared and the masterbatch used to prepare the concentrate.

TABLE VIII

| | Concentrate Example | |
|---|---|---|
| | 21 | 22 |
| Ingredients | Parts by Weight | |
| Unregenerated cellulose fiber | 100 | 100 |
| Lubricant | 15–25 | 25–50 |
| Precipitated silica | 0–10 | — |
| Styrene-butadiene rubber | 5–20 | — |
| EPDM rubber | — | 5–15 |
| FEF carbon black | 0–10 | 2–10 |
| Bonding agent | .25–10 | .25–10 |

Treated fiber of Example 21 is a general purpose fiber suitable for incorporating into any of the elastomers of high unsaturation. Treated fiber of Example 22 is particularly adapted for elastomers of low unsaturation and is advantageous where relatively high levels of lubricant are acceptable in the reinforced composite. Wood pulp made by the sulfate process is a fiber which gives excellent results in either formulation. Other suitable fibers are cotton linters. They are the short fibers adhering to cottonseed after ginning. Where desired, the so-called chemical cottons can be substituted. These are purified cotton linters pulp available from Hercules Company. For example, a composite of 144.9 parts of H-1 masterbatch, 106.1 parts chemical cotton concentrate and 5 parts of aromatic processing oil forms in about half the time required to combine the ingredients directly and has superior physical properties. The composition of the concentrate is chemical cotton 75 parts, aromatic processing oil 15 parts, and H-1 masterbatch 16.1 parts.

Still another suitable fiber, although less preferred, is exploded wood fiber. This fiber still contains most of the lignin and is formed by subjecting wood to the pressure of steam in an autoclave and releasing the pressure.

The lubricant of Example 21 is advantageously selected from aromatic types to assure compatibility with the SBR. Liquid novolak resins, which are viscous thermoplastic phenolic resins, function as lubricants and in combination with hexamethylenetetramine or other base added to the matrix show fiber bonding properties. The presence of silica is desirable. For use with EPDM rubber of Example 22, an aliphatic type lubricant is desirable. Liquid polybutenes exert several lubricating characteristics superior to those of conventional petroleum based lubricating oils for lubricating metal surfaces and are also effective fiber lubricants. The molecular weight of polybutene lubricants falls within the range of 400–2400. Chlorinated paraffinic hydrocarbons combine fiber lubricating properties with fire retardant properties which is advantageous for some applications.

The alkylene resorcinol bonding agent may, as indicated previously, be replaced by other resorcinol based bonding systems several of which comprise resorcinol-formaldehyde resins. Other methylene donors such as dimethylol urea, dimethylol ethylene urea and hexamethoxymethylmelamine may be used in conjunction therewith in forming composites from the treated fiber. Isocyanate bonding systems comprise:
methylene-bis-phenylisocyanate $CH_2(C_6H_4NCO)_2$
methylene-bis-phenylcarbanilate
$CH_2(C_6H_4NHC(O)OC_6H_5)_2$
2,4-toluenediisocyanate
tri(isocyanophenyl)methane $CH(C_6H_4NCO)_3$
and polymethylene polyphenylisocyanate.

The isocyanates will, in general, be used in the range of 0.25–2.5 parts and the resorcinol based resins in the range of 3–10 parts.

Concentrates described in Table IX are prepared from non-elastomeric polymer by charging an internal mixer with hardwood fiber, hard polyvinyl chloride resin and lubricant using a phthalate ester as lubricant and mixing for 3 minutes at 155 rpm. Steam heat is used to promote softening of the polymer.

TABLE IX

| | Concentrate Example | | |
|---|---|---|---|
| | 23 | 24 | 25 |
| Ingredients | Parts by Weight | | |
| Hardwood dry lap pulp | 100 | 100 | 100 |
| Copolymer of vinyl chloride and vinyl acetate | 20 | 10 | 20 |
| Lubricant | 40 | 20 | 20 |
| Titanium dioxide | 20 | 10 | 10 |

In each case, the fiber is well-dispersed and inhibited from fiber-to-fiber affinity. The treated fiber mixes readily with vinyl chloride polymers to produce compositions adapted to the myriad uses of polyvinyl chloride. Adding the fiber as the concentrate permits the formation of fiber reinforced composites of polyvinyl chloride sometimes difficult or impossible otherwise depending upon the mixing facilities available.

Cellulose fiber treated with vinyl chloride polymer or copolymer resin and lubricant is particularly valuable for the manufacture of plastic fiber reinforced floor tile. Polyvinyl chloride resin composed of more than 50% polyvinyl chloride is commonly used in floor tile, examples of which are copolymers with vinyl acetate or vinylidene chloride, a typical copolymer being 87% vinyl chloride and 13% vinyl acetate. Asbestos, the principal reinforcing agent used in floor tile, requires special processing. A process involving a dough of asbestos fiber, solvents and polymer and a special type of calender is used to overcome the difficulty of mixing and wetting out the bulky asbestos fibers with high melt viscosity PVC polymer. Predispersed cellulose fiber can also be used as a reinforcement for such tiles and tiles containing cellulose fibers have been reported to have better dimensional stability and indentation and abrasion resistance than control plates containing asbestos fibers. By the predispersion herein described, preparation of cellulose reinforced tile is greatly facilitated. Moreover, the replacement of asbestos by predispersed wood pulp requires lower fiber loading for equivalent reinforcement.

Addition of an organic ketene dimer paper sizing improves the water resistance. The organic ketene dimer paper sizings have the formula $[RCH=C=O]_2$ where R is a hydrocarbon group such as alkyl of 8 or more carbon atoms, cycloalkyl of 6 or more carbon atoms, aryl, aralkyl or alkaryl. The addition of 1% mixed hexadecyl, tetradecyl ketene dimer, based on the weight of the fiber, to fiber concentrate Examples 23, 24 and 25 significantly improves the properties of tile prepared therefrom. The amount of sizing will usually be within the range of 0.01% to about 5% by weight of the pulp, preferably 0.5% to 1% and may be supported on silica as described by Weisgerber, U.S. Pat. No. 2,865,743.

The composition of other illustrative concentrates prepared by treating the fiber with nitrile rubber with or without carbon black or with neoprene and carbon black in a mixer in a 5 minute mixing cycle using phthalate ester as lubricant with the nitrile rubber and aromatic processing oil as lubricant with the neoprene is set forth in Table X.

TABLE X

| | Concentrate Example | | |
|---|---|---|---|
| | 26 | 27 | 28 |
| Ingredients | Parts by Weight | | |
| Hardwood dry lap pulp | 100 | 100 | 100 |
| Lubricant | 20 | 20 | 16.6 |
| Butadiene-acrylonitrile copolymer (Hycar 1052) | 10 | — | — |
| Blend of butadiene-acrylonitrile copolymer and polyvinyl chloride 70/30 (Hycar 1203) | — | 10 | — |
| FEF carbon black | — | 5 | 16.6 |
| Neoprene GRT | — | — | 16.6 |

The treated fiber disperses readily into plastic polymers compatible with the treating adjuvant. For example, concentrate Example 27 disperses rapidly into nitrile rubber in a 5 minute mixing cycle. Admixture of 110 parts by weight of concentrate, 90 parts by weight of the same butadiene copolymer, 30 parts by weight reinforcing filler plus curing ingredients and bonding ingredients gives, after vulcanizing in a press for 60 minutes at 152.8°C, a vulcanizate having in the direction of principal fiber orientation tensile strength of 217.955 ksc and Young's modulus of 3656.016 ksc.

Equal parts of the neoprene concentrate Example 28 and neoprene mix readily together with bonding and vulcanizing ingredients to give, after curing at 152.8°C, a vulcanizate having a tensile strength of 221.470 ksc in the direction of principal orientation of the fiber and a Young's modulus of 3234.168 ksc.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A treated fiber comprising discontinuous cellulose fiber of aspect ratio greater than one, organic polymer, which can be processed as a thermoplastic substance, in amount sufficient to reduce fiber-to-fiber affinity up to 50 parts by weight per 100 parts by weight of the fiber and lubricant, said lubricant being an oily or unctuous organic material of molecular weight greater than 95 characterized by being adsorbable to the fiber surface and enhancing receptiveness of the fiber to said polymer, adsorbed by the fiber in amount sufficient to enhance receptiveness of the fiber to the polymer and separation of individual fibers.

2. A treated fiber of claim 1 in which polymer is a thermoplastic normally hard polymer and the lubricant is a plasticizer for the polymer.

3. A treated fiber of claim 1 in which the fiber is wood cellulose, the polymer is unvulcanized elastomer in 2.5–30 parts by weight and the lubricant is a plasticizer for the elastomer in 10–40 parts by weight.

4. A treated fiber of claim 3 in which the amount of lubricant is equal to or greater than the amount of elastomer.

5. A treated fiber of claim 2 in which the polymer is a vinyl chloride polymer or copolymer, the lubricant is an ester plasticizer for the polymer and the fiber is the major component of the total composition.

6. A treated fiber of claim 3 in which the wood cellulose fiber is the major component of the total composition, the elastomer is a diene rubber and the lubricant is rubber processing oil.

7. A treated fiber of claim 6 which contains carbon black in amount of 2.5–50 parts by weight.

8. A treated fiber of claim 6 in which the wood fiber has an average aspect ratio within the range of 5–350 and a bonding agent is present.

9. A treated fiber of claim 3 in which wood cellulose fiber is the major proportion of the total composition and the lubricant is palm oil or peanut oil.

10. A treated fiber of claim 1 in which the fiber is wood pulp, the lubricant is a water immiscible processing aid for the plastic polymer of molecular weight at least about 150 and the amount of lubricant is equal to or greater than the amount of plastic polymer.

11. The process which comprises subjecting to shearing forces, a mixture of discontinuous cellulose fiber of aspect ratio greater than one, organic polymer, which can be processed as a thermoplastic substance, in amount sufficient to reduce fiber-to-fiber affinity up to 50 parts by weight per 100 parts by weight of fiber and lubricant, said lubricant being an oily or unctuous organic material of molecular weight greater than 95 characterized by being adsorbable to the fiber surface and enhancing receptiveness of the fiber to said polymer in amount sufficient to enhance receptiveness of the fiber to the polymer and separation of individual fibers.

12. The process of claim 11 in which the polymer is an unvulcanized elastomer.

13. The process of claim 12 in which the fiber is wood fiber, the wood fiber is the major component of the total mixture and the amount of lubricant is equal to or greater than the amount of the elastomer.

14. The process of claim 11 in which the polymer is unvulcanized elastomer, the amount of elastomer is 2.5–30 parts by weight, the lubricant is hydrocarbon oil, vegetable oil or phthalate ester and the amount of lubricant is 10–40 parts by weight.

15. The process of claim 11 in which the fiber is wood cellulose, the polymer is thermoplastic normal hard polymer and the lubricant is also a plasticizer in the polymer.

16. The process of claim 14 in which the elastomer is a diene rubber, the lubricant is a plasticizer for the elastomer, and the fiber is wood pulp of average aspect ratio within the range of 5–350 and carbon black or silica is present.

17. The process of preparing fiber reinforced plastic polymer which comprises (1) preparing a concentrate by subjecting to shearing forces a mixture of short unregenerated cellulose fiber of aspect ratio greater than one, organic polymer, which can be processed as a thermoplastic substance, in amounts up to 50 parts by weight per 100 parts by weight of fiber sufficient to reduce fiber-to-fiber affinity and lubricant, said lubricant being an oily or unctuous organic material of molecular weight greater than 95 characterized by being adsorbable to the fiber surface and enhancing receptiveness of the fiber to said polymer, in amount sufficient to enhance receptiveness of the fiber to the polymer and separation of individual fibers and (2) mixing the concentrate with polymer compatible with the concentrate.

18. The process of claim 17 in which the amount of lubricant in step (1) is equal to or greater than the amount of the polymer.

19. The process of claim 17 in which the fiber is wood pulp and the organic polymer is unvulcanized diene rubber.

20. The process of claim 17 in which carbon black or silica is present in step (1) of preparing a concentrate.

21. The process of claim 19 which includes the steps of adding bonding and curing ingredients and heating at curing temperature.

22. The process of claim 21 in which silica is present in step (1) of preparing a concentrate.

23. The process of claim 18 in which the fiber is cotton linters.

24. A treated fiber comprising wood pulp of aspect ratio greater than one, vinyl chloride polymer or copolymer composed predominately of polyvinyl chloride in amounts sufficient to reduce fiber-to-fiber affinity up to 50 parts by weight per 100 parts by weight of the fiber, and fiber lubricant, said lubricant being an oily or unctuous organic material characterized by being adsorbable to the fiber surface, enhancing receptiveness of the fiber to said polymer or copolymer and a plasticizer for the polymer or copolymer, in amount which enhances receptiveness of the fiber to the polymer or copolymer and separation of individual fiber.

25. The treated fiber of claim 24 which contains ketene dimer sizing in amount to increase the moisture resistance of the fiber.

* * * * *